(12) United States Patent
Caulder

(10) Patent No.: US 11,473,362 B2
(45) Date of Patent: Oct. 18, 2022

(54) BOARD APPARATUS

(71) Applicant: Randy Caulder, Fairmont, NC (US)

(72) Inventor: Randy Caulder, Fairmont, NC (US)

( * ) Notice: Subject to any disclaimer, the term of this patent is extended or adjusted under 35 U.S.C. 154(b) by 0 days.

(21) Appl. No.: 17/096,871

(22) Filed: Nov. 12, 2020

(65) Prior Publication Data

US 2021/0140224 A1    May 13, 2021

Related U.S. Application Data

(60) Provisional application No. 62/934,401, filed on Nov. 12, 2019.

(51) Int. Cl.
| | | |
|---|---|---|
| *E06B 1/36* | (2006.01) | |
| *E06B 9/52* | (2006.01) | |
| *E06B 1/06* | (2006.01) | |
| *F16B 5/06* | (2006.01) | |

(52) U.S. Cl.
CPC ............... *E06B 1/36* (2013.01); *E06B 1/06* (2013.01); *E06B 9/52* (2013.01); *F16B 5/0692* (2013.01); *E06B 2009/527* (2013.01)

(58) Field of Classification Search
CPC ..... E06B 1/36; E06B 1/06; E06B 9/52; E06B 2009/527; E04H 15/646; F16B 5/0692
USPC ............ 52/204.1, 204.2, 215, 204.5, 204.53, 52/204.55, 204.62, 204.7
See application file for complete search history.

(56) References Cited

U.S. PATENT DOCUMENTS

| | | | |
|---|---|---|---|
| 4,019,303 A | 4/1977 | McAllister | |
| 4,662,038 A * | 5/1987 | Walker | F16B 5/0692 24/460 |
| 6,125,910 A * | 10/2000 | Pepperell | E06B 9/01 160/371 |
| 6,684,584 B1 * | 2/2004 | Goldwitz | E04H 15/646 135/143 |
| 6,945,305 B1 * | 9/2005 | Limauro | E06B 9/52 160/369 |
| 7,861,473 B1 * | 1/2011 | Green | E06B 9/521 52/210 |
| 8,056,602 B1 * | 11/2011 | Green | E06B 9/52 160/392 |
| 8,123,060 B2 | 2/2012 | Obergoenner | |
| 8,146,647 B1 * | 4/2012 | Hughes | E06B 9/52 160/371 |
| 8,572,928 B2 * | 11/2013 | Bruder | E04B 2/7818 52/775 |
| 8,826,612 B2 | 9/2014 | Matta | |
| 8,985,183 B2 * | 3/2015 | Terry | E06B 9/24 160/378 |
| 9,453,369 B1 * | 9/2016 | Green | E06B 9/52 |

(Continued)

FOREIGN PATENT DOCUMENTS

| | | | |
|---|---|---|---|
| KR | 20140020519 A | * | 2/2014 |
| KR | 200476548 Y1 | * | 3/2015 |

(Continued)

*Primary Examiner* — Brent W Herring

(57) ABSTRACT

A board apparatus is presented. The board apparatus includes an elongate body having an upper groove and a back portion lip, a removable elongate member configured for placement within the upper groove, and a screen. The screen includes a lower end configured to fit in the upper groove and below the back portion lip. The apparatus is useful for providing easy installation and removal of windows and screens.

13 Claims, 4 Drawing Sheets

(56) References Cited

U.S. PATENT DOCUMENTS 10,156,089 B2 * 12/2018 Bacon .................. E06B 3/9681
2013/0092334 A1 * 4/2013 Terry ....................... E06B 9/52
160/368.1

FOREIGN PATENT DOCUMENTS

KR       20200121226 A * 10/2020
KR         200494602 Y1 * 11/2021

* cited by examiner

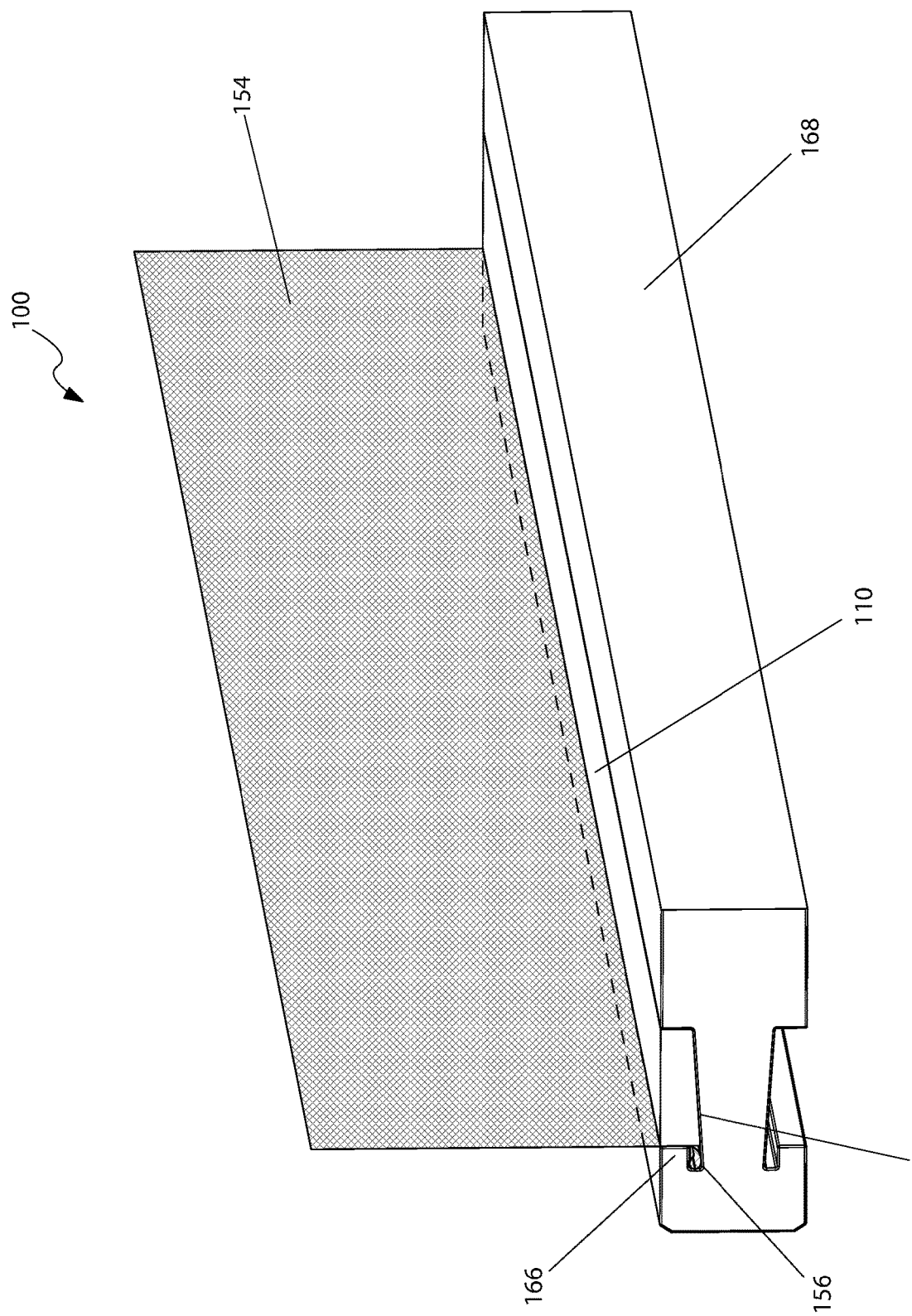

BOARD APPARATUS

CROSS-REFERENCE TO RELATED APPLICATIONS

This application claims the benefit of U.S. Provisional Patent Application No. 62/934,401, filed on Nov. 12, 2019, which is incorporated by reference herein in its entirety.

FIELD OF THE INVENTION

This invention relates to window installation. More particularly, it relates to a board for installation of windows and screens.

BACKGROUND

A window is an opening in a wall, door, roof or vehicle that allows the passage of light, sound, and sometimes air. Modern windows are usually glazed or covered in some other transparent or translucent material, a sash set in a frame in the opening; the sash and frame are also referred to as a window. Many glazed windows may be opened, to allow ventilation, or closed, to exclude inclement weather. Windows often have a latch or similar mechanism to lock the window shut or to hold it open by various amounts.

Types include eyebrow windows, fixed windows, single-hung and double-hung sash windows, horizontal sliding sash windows, casement windows, awning windows, hopper windows, tilt and slide windows (often door-sized), tilt and turn windows, transom windows, sidelight windows, jalousie or louvered windows, clerestory windows, skylights, roof windows, roof lanterns, bay windows, oriel windows, thermal, or Diocletian, windows, picture windows, emergency exit windows, stained glass windows, French windows, panel windows, and double—and triple paned windows.

A window screen (also known as insect screen, bug screen, fly screen, wire mesh) is designed to cover the opening of a window. It is usually a mesh made of plastic wire, or other pieces of plastic and stretched in a frame of wood or metal. It serves to keep leaves, debris, spiders, insects, birds, and other animals from entering a building or a screened structure such as a porch, without blocking fresh airflow.

For example, to install a window screen, one would first remove the window screen using the following directions: a) open the glass window completely from the inside (you must be able to access the entire screen frame for this process); b) locate the lift tabs at the bottom of the screen (they are normally square or rectangular flaps that extend out from the screen's mesh); c) hand-pull the tabs upward to release the bottom of the frame from the window. Tension springs at the top of the screen's frame will compress to allow spacing for screen removal. Allow the frame to drop downward once it clears the window's bottom assembly. Pull the screen down and away from the window.

Next, the window screen would be installed using the following directions: a) slide the new or repaired screen up into the top of the window frame while grasping the screen's base; b) grasp the lift tabs. Lift the screen upward with the lift tabs to compress the tension springs; c) Maneuver the screen's base with the lift tabs into the window's frame. Release the upward motion on the lift tabs. Allow the screen's frame to gently drop down into the window's frame; d) Visually inspect the frame's position in the window. Slide the frame slightly from side to side to center it in the window's opening, if necessary. There should be no large openings for pest infiltration.

The installation of window screens and windows in sunrooms and screened in porches is common in most areas where the weather in the summer is desired and a window is desired in the winter time. These take much time and further require some level of expertise to properly install the window screens and windows.

In light of the foregoing, it would be desirable to devise an improved windowsill to allow for easy installation and removal of windows and window screens.

BRIEF DESCRIPTION OF THE DRAWINGS

FIG. 4 is an illustrated view of the completed board apparatus.

DETAILED DESCRIPTION

Figure 1:
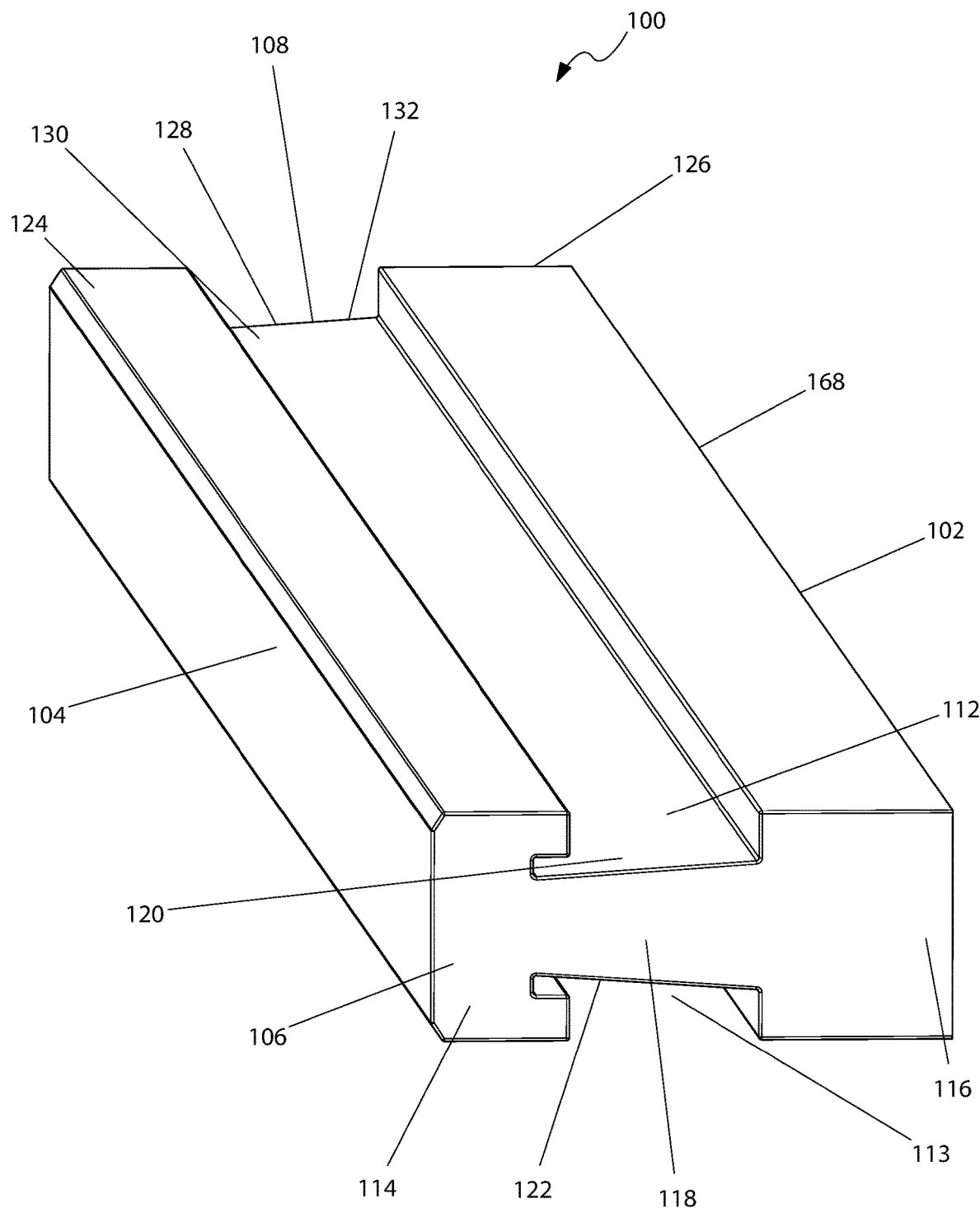
FIG. 1 is an illustrated view of an exemplary board apparatus.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of an exemplary board apparatus 100 for providing easy installation and removal of windows and screens is presented. The board apparatus 100 may include an elongate body 168 having a front portion 102, a back portion 104, a left side 106, a right side 108, an upper groove 112, and a lower groove 113. The board apparatus 100 may further include a left side back portion 114, a left side front portion 116, a left side middle portion 118, a left side middle portion upper side 120, and a left side middle portion lower side 122. In similar fashion, the board apparatus 100 may also include a right side back portion 124, a right side front portion 126, a right side middle portion 128, a right side middle portion upper side 130, and a right side middle portion lower side 132. The left side middle portion 118 and the right side middle portion 128 may be more narrow in depth than the left/right side front portion 116/126. The left side middle portion may include a tapered shape.

Figure 3:
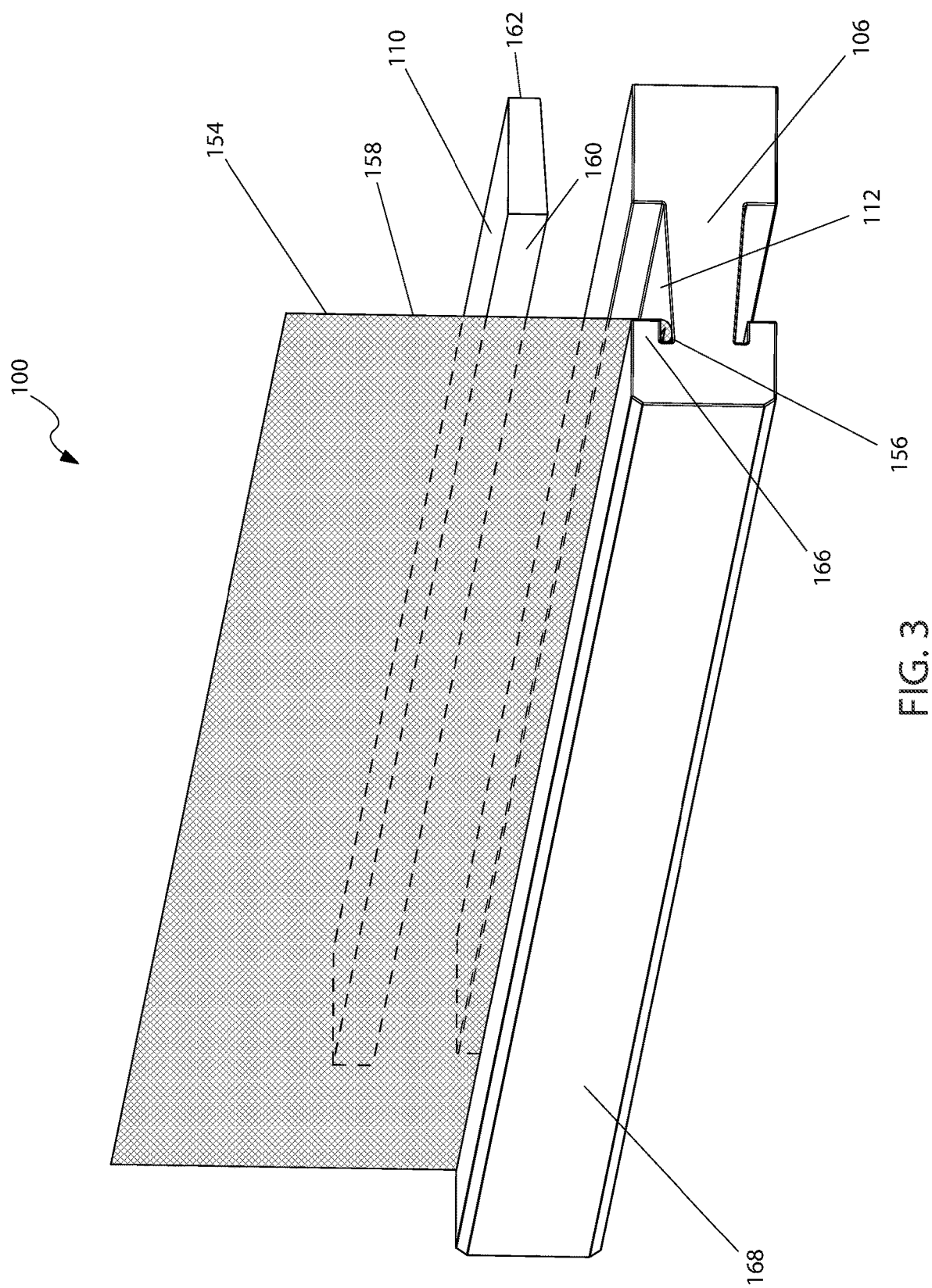
FIG. 3 is an illustrated perspective view of the board apparatus and removable elongate member from FIG. 1 and FIG. 2, shown during the process of screen installation.

The board apparatus 100 may allow for the installation of a screen 154 (not shown, see FIG. 3). The board apparatus 100 may also allow for the installation of a glass panel (not illustrated). The left side of the board apparatus may be substantially T-shaped. Further, the left side 106 of the board apparatus 100 may be congruent to the right side 108.

Figure 2:
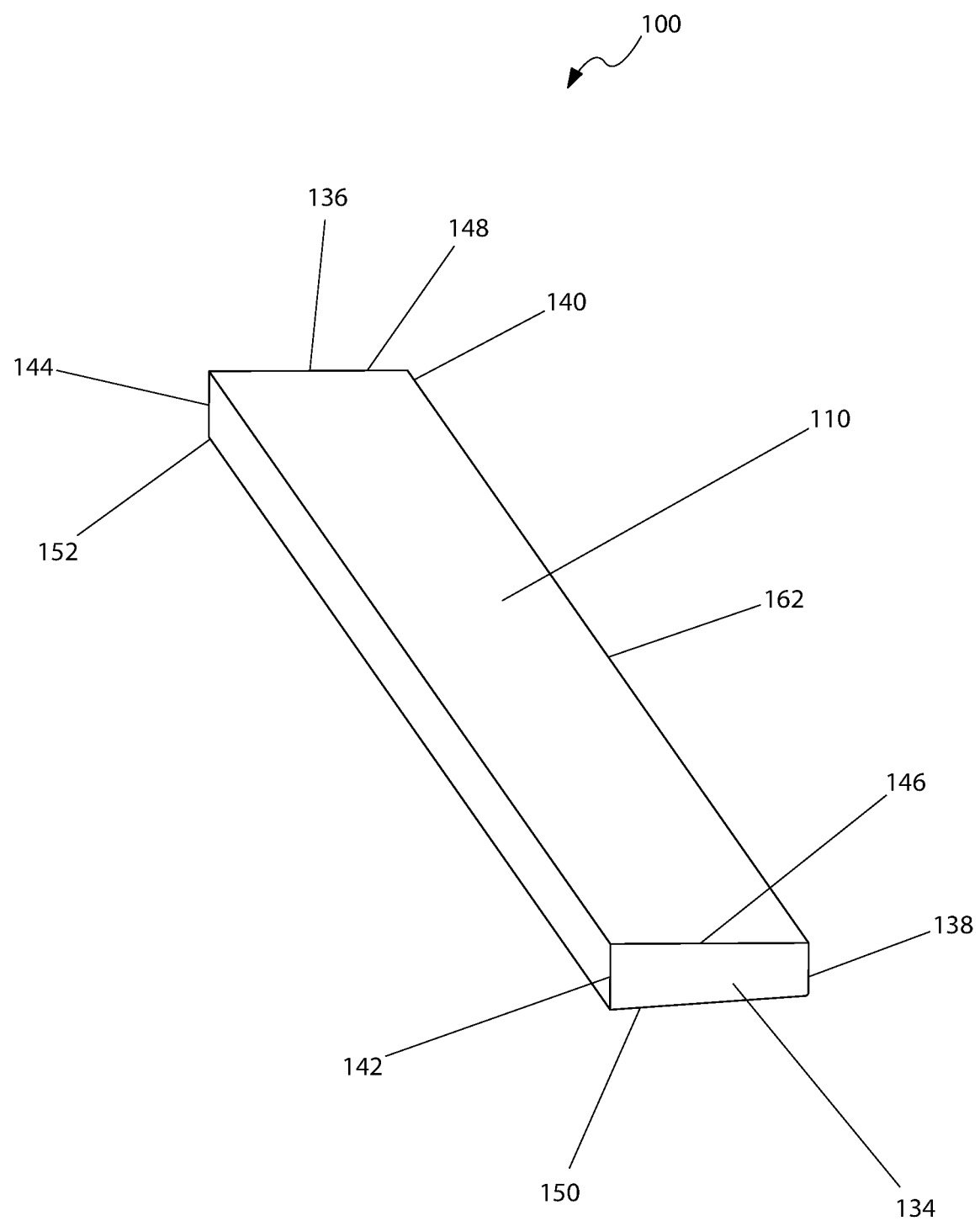
FIG. 2 is an illustrated view of an elongate member from the exemplary board apparatus shown in FIG. 1.

Referring to FIG. 2, an illustrated perspective view of the exemplary board apparatus 100 shown in FIG. 1 for providing easy installation and removal of windows and screens is presented. The board apparatus 100 may also include a removable elongate member 110. The removable elongate member 110 may include a front side 162, a left side 134, a right side 136, a front end left side 138, a front end right side 140, a back end left side 142, a back end right side 144, an upper end left side 146, an upper end right side 148, a lower end left side 150, and a lower end right side 152. The removable elongate member 110 may be sized to fit in the upper groove 112 (see FIG. 1).

Moving now to FIG. 3, an illustrated use of the board apparatus 100 shown in FIG. 1 is presented. The board apparatus may include a screen 154 having a left side 158 and a lower end 156, configured for placement within the upper groove 112 of the elongate body 168. The left side 106 of the elongate body 168 may include a back portion lip 166 that hangs over the left side middle portion upper side 120. The back portion lip 166 may be configured to receive the lower end 156 of the screen. The lower end 156 may also include a bend or curved tip that allows for placement beneath the back portion lip 166. The removable elongate member 110 may also include a back side 160. The back side 160 may be wider in depth than the removable elongate member 110 front side 162. Upon placement within the upper groove 112, the back side 160 of the removable elongate member 110 may be configured to hold the screen 154 in place within the upper groove 112.

Referring finally to FIG. 4, an illustrated view of the installed board apparatus 100 is presented. As before, the board apparatus 100 may include an elongate body 168 having an upper groove 112 and a back portion lip 166, a removable elongate member 110 configured for placement within the upper groove 112, and a screen 154. The screen 154 may include a lower end 156 configured to fit in the upper groove 112 and below the back portion lip 166. The apparatus 100 may be useful for providing easy installation and removal of windows and screens.

The board apparatus 100 may be configured for a method of installing a screen according to an embodiment of the present disclosure. In particular, the method of installing a screen may include one or more components or features of the board apparatus 100 as described above. As disclosed, the method of installing a screen may include the steps of: step one, providing a board apparatus, said board apparatus having an elongate body having an upper groove, and a removable elongate member sized to fit in said upper groove; step two, removing said removable elongate member from said upper groove; step three, placing said screen in said upper groove; step four, placing said removable elongate member back in said upper groove; and step five, installing said board apparatus and screen in a desired location of a building structure. Further, placing said screen in said upper groove may include wrapping a lower end of said screen around a back portion lip of a back portion of said elongate body. Further still, placing said removable elongate member back in said upper groove includes placing said removable elongate member back in said upper groove so that a back side of removable elongate member is coupled to said screen.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A board apparatus, said board apparatus consisting of:
   an elongate body having a front portion, a back portion, a left side, a right side, an upper groove, and a lower groove;
   the elongate body further having, wherein said left side has a left side back portion, a left side middle portion and a left side front portion, wherein said left side middle portion has a left side middle portion upper side and a left side middle portion lower side, and wherein said left side middle portion has a tapered shape; and
   a removable elongate member, said removable elongate member sized to fit in said upper groove.

2. The board apparatus of claim 1, wherein said board apparatus allows for the installation of a screen.

3. The board apparatus of claim 1, wherein said board apparatus allows for the installation of a glass panel.

4. The board apparatus of claim 1, wherein said left side middle portion upper side and said left side middle portion lower side are in a non-parallel configuration.

5. The board apparatus of claim 1, wherein said left side is substantially T- shaped.

6. The board apparatus of claim 1, wherein said left side is congruent to said right side.

7. The board apparatus of claim 1, wherein said removable elongate member is configured to secure a screen in said upper groove.

8. The board apparatus of claim 1, wherein a back side of said removable elongate member is coupled to a screen.

9. The board apparatus of claim 1, wherein a screen is coupled to a back portion lip of said back portion of said elongate body.

10. The board apparatus of claim 1, wherein a lower end of a screen wraps around a back portion lip of said back portion of said elongate body.

11. A method of installing a screen, said method consisting of:
- providing a board apparatus, said board apparatus having an elongate body having an upper groove, a removable elongate member sized to fit in said upper groove a left side having a left side back portion, a left side middle portion and a left side front portion, and wherein said left side middle portion has a tapered shape;
- removing said removable elongate member from said upper groove; placing said screen in said upper groove;
- placing said removable elongate member back in said upper groove; and
- installing said board apparatus and screen in a desired location of a building structure.

12. The method of claim 11, wherein said placing said screen in said upper groove includes wrapping a lower end of said screen around a back portion lip of a back portion of said elongate body.

13. The method of claim 11, wherein said placing said removable elongate member back in said upper groove includes placing said removable elongate member back in said upper groove so that a back side of removable elongate member is coupled to said screen.

\* \* \* \* \*